Dec. 18, 1934.  J. O. HEINZE  1,985,168
MOTOR VEHICLE CONTROL MECHANISM
Filed Aug. 20, 1932  2 Sheets-Sheet 1
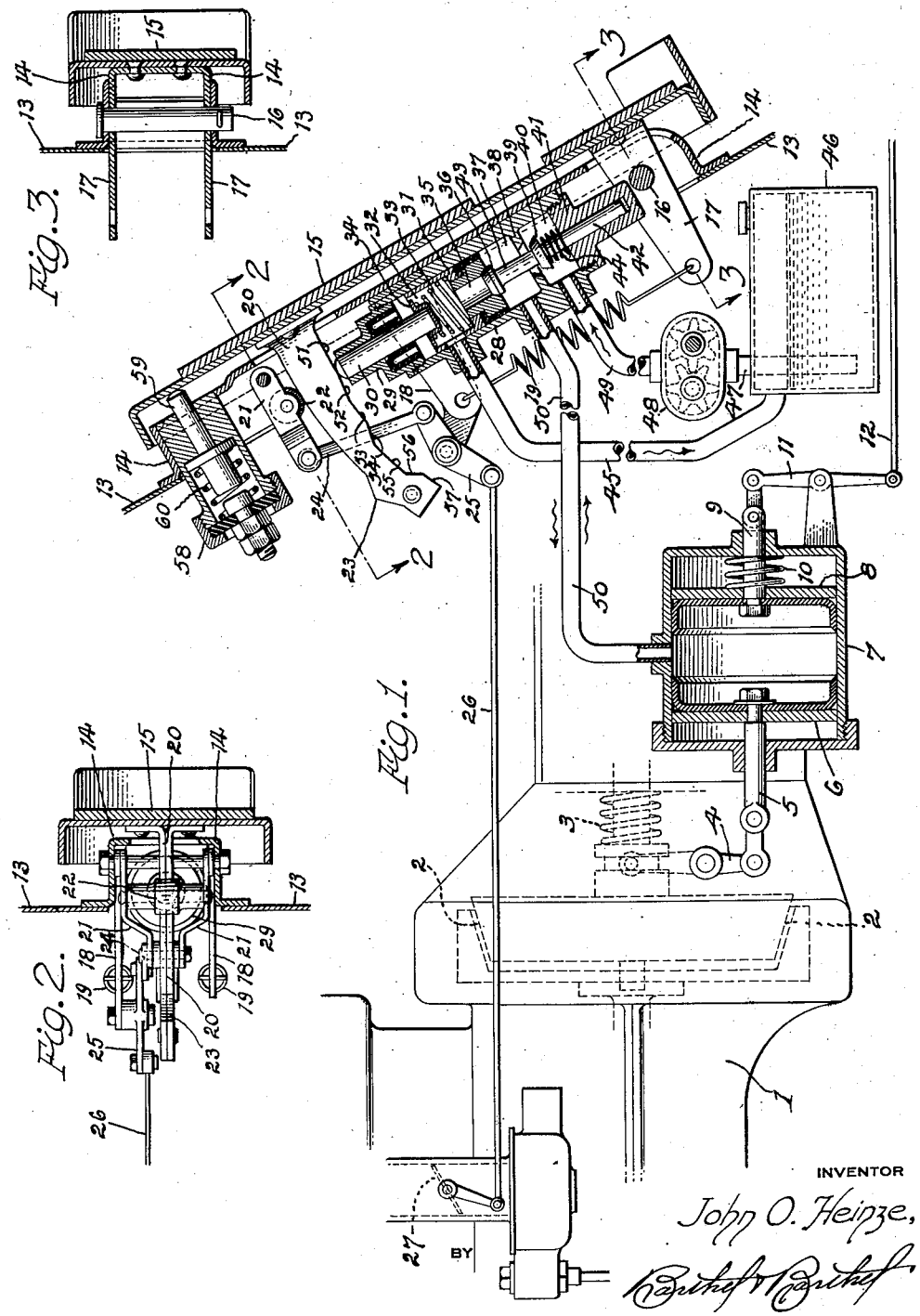
INVENTOR
John O. Heinze,
BY
ATTORNEYS Dec. 18, 1934. J. O. HEINZE 1,985,168
MOTOR VEHICLE CONTROL MECHANISM
Filed Aug. 20, 1932 2 Sheets-Sheet 2
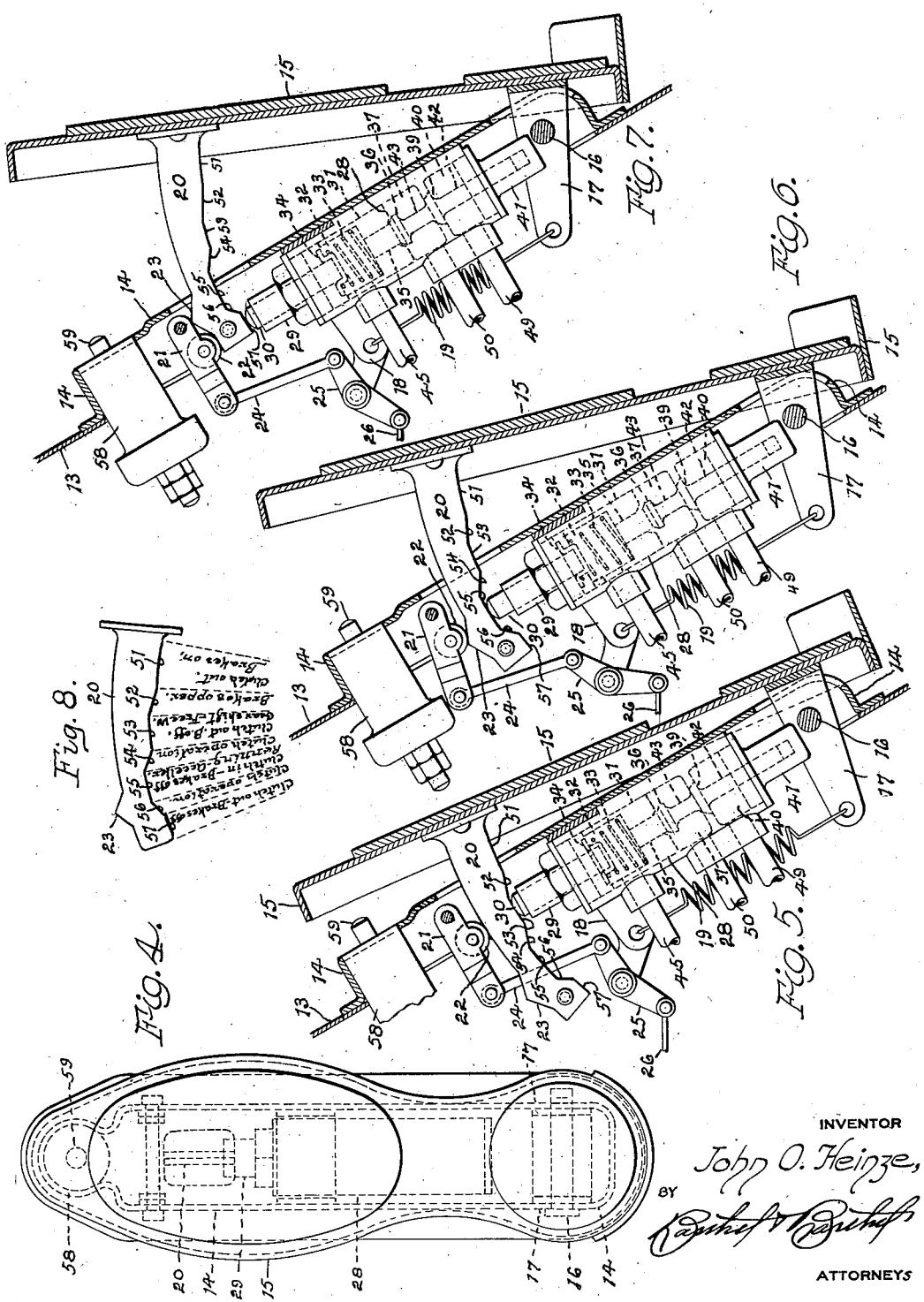

Patented Dec. 18, 1934

1,985,168

UNITED STATES PATENT OFFICE 1,985,168

MOTOR VEHICLE CONTROL MECHANISM

John O. Heinze, Detroit, Mich., assignor of one-half to Arthur L. Cash, Marine City, Mich.

Application August 20, 1932, Serial No. 629,647

9 Claims. (Cl. 192—.01)

This invention relates to mechanism for controlling the operation of the several instrumentalities of a motor vehicle, such as the clutch, the brakes, the accelerator for controlling the supply of fuel to the engine, and the engine starter; the arrangement of this mechanism being such as to insure the operation of these several instrumentalities in their proper sequence and timed relation, thereby eliminating the danger of mistakes in operation, and, preferably, the operation is effected by means of a single control member, such as a single foot pedal. A further object is to provide a construction of such mechanism whereby the same is adapted to operate hydraulically, and whereby a very simple, compact and efficient construction is secured which may be conveniently applied to motor vehicles as commonly constructed and arranged.

With the above and other ends in view, the invention resides in the matters hereinafter set forth and more particularly pointed out in the appended claims, reference being had to the accompanying drawing wherein:

Figure 1 is a longitudinal section through an operating foot pedal and adjacent operating mechanism and starter switch, controlled thereby, together with an engine, engine clutch, and carburetor illustrated diagrammatically, and an oil cylinder, oil tank, and pump with their several operative connections and pipe connections shown more or less diagrammatically;

Figs. 2 and 3 are transverse sections substantially upon the lines 2—2 and 3—3 of Figure 1;

Fig. 4 is a plan view of a foot pedal shown in Figure 1;

Figs. 5, 6 and 7 are side elevations of the operating mechanism shown in Figure 1 with the foot pedal shown in section and in the different positions of its successive operations, and Fig. 8 is a detail side elevation of a cam arm.

As shown in Figure 1, 1 indicates the rear end of the usual internal combustion engine as usually installed upon a motor vehicle, and showing the usual clutch casing enclosing the usual cone clutch 2 which is urged toward engaged position in the usual manner, by a spring 3, and is moved against the action of said spring by the usual pivoted lever 4.

To move said clutch to disengaged position, said lever 4 is connected at its lower end to the forward end of a piston rod 5, the rear end of which rod is connected to a piston 6 within a fluid or oil cylinder 7, within the opposite end of which cylinder is a second piston 8 in opposed relation to said clutch piston 6, and this second or brake piston 8 has a piston rod 9 extending through the rear end of said cylinder with a spring 10 interposed between said brake piston and said end of said cylinder to normally urge said brake piston toward said clutch piston. Operatively connected to the outer end of said rod 9 is a lever 11 pivotally supported intermediate its ends and to the lower end of which a brake operating rod 12 is connected and extends rearwardly of the vehicle and is connected in the usual manner to the wheel brakes of the vehicle to operate the same.

As shown, the toe board of the vehicle is indicated by the numeral 13 and over an opening in said toe board is secured a supporting frame 14 to the lower end of which, the heel portion of a foot pedal 15 is pivotally attached by a pivot pin 16 passing through ears 17 secured to and extending from the lower side of said pedal through an opening in said frame 14 and through said opening in said toe board. Secured to the under side of said frame 14 and also extending through said opening in the toe board, is another pair of ears 18 and springs 19 are connected under tension to said ears 17 and 18 to exert a turning force upon said pedal and normally hold said pedal swung upon its pivot, outwardly or away from said frame and toe board.

Secured at one end to the under side of said foot pedal adjacent its toe portion, is a cam arm 20 to project through an opening in the frame member 14 and to move endwise with the swinging of said pedal, this arm being curved longitudinally in its general direction, substantially concentric with the pivotal axis of said pedal, and pivotally attached to said frame adjacent the upper edge of this arm, is a lever 21 carrying a roller 22 adapted to ride upon said edge and to be swung by said roller passing over a cam projection 23 on said edge of said arm near its free end. Connected to the free end of said lever 21 is a link 24, the opposite end of which is connected to one arm of a rocker 25, to the opposite arm of which rocker, a rod 26 is connected which rod is connected to the throttle valve 27 of the engine. Therefore, whenever said foot pedal is swung, bringing said cam projection 23 on said arm 20 into contact with said roller 22, the engine throttle 27 will be operated, and by moving said pedal slightly with said cam in contact with said roller, the engine may be accelerated or decelerated at will.

Secured to the under side of the frame 14 below the cam arm 20, is a fluid operated piston valve comprising a cylinder 28 closed at its upper end by a plug cap 29 through which a push rod 30 extends with a packing surrounding said rod to prevent leakage of oil from said cylinder. Within this cylinder 28 below said cap, is a piston 31 formed hollow at its upper end which is spaced from said cap and forms a chamber 32 at the upper end of said piston, and in this chamber is a coiled spring 33 interposed between a head 34 on the inner end of said push rod 30 and the lower end of the bore of the piston 31 forming said chamber. The lower end portion of said piston is formed with an axial passage 35 opening into said chamber, said piston being formed at its lower end with a valve seat for a valve 36 adapted to close said passage and prevent communication therethrough, of said chamber 32 with a chamber 37 below said piston 31, which chamber 37 is formed by a dividing wall 38 extending across the bore of said cylinder 28 at a distance below the lower end of said piston, said dividing wall being formed with an axial opening providing a seat for an upwardly seating valve 39 to close communication between said chamber 37 and a chamber 40 formed in the lower end of said cylinder between said wall 38 and the inner end of a plug 41 screwed into the lower end of the cylinder 28, said valve 39 having a stem 42 guided in an axial bore in said plug 41 and said valves 36 and 39 are connected by a stem 43 integral with said valves so that they are held in spaced apart relation and must move together. To normally hold said valve 39 to its seat and the valve 36 in position to engage its seat on the lower end of the piston 31, a light coiled spring 44 is interposed between said valve 39 and said plug 41 within said chamber 40.

Opening at one end into the chamber 32 through an opening in the side wall of the piston 31, is a pipe or conduit 45 which leads to and is open at its opposite end into the upper part of an oil supply tank 46 and leading from this tank is an oil outlet pipe 47, the lower end of which extends through the top of said tank to near its bottom and is connected at its upper end to a suitable oil pump 48 which pump is driven in any suitable manner (not shown), as by the engine 1, directly or indirectly, so that this pump will always be operating when the engine is running, and leading from the other side of this pump, is a pipe 49, the upper end of which opens directly into the chamber 40 of the piston-valve cylinder 28. Opening directly at one end into the chamber 37 of said cylinder 28, is a pipe 50, the opposite end of which is open into the oil cylinder 7 between the pistons 6 and 8 therein.

As previously stated, the push rod 30 projects at its upper end, through the plug cap 29 in the upper end of the cylinder 28, and the cam arm 20 is so arranged and carried by the foot pedal 15, that the upper end of this push rod 30 engages and is held in contact with the lower side edge of said arm throughout the entire movement of said arm as it is projected or retracted by the swinging of said pedal; and to effect an endwise movement of said rod at the proper time and in the proper sequence of such movements to operate the piston valve and control the engagement and release of the clutch, the setting of the brakes, and the operation of the engine accelerator in proper timed relation and sequence, said cam arm 20 is formed along its lower side edge engaged by the end of said rod 30, with a series of surfaces arranged at different distances from the axis of the pivot 16 of said pedal, these several surfaces being connected by inclined portions so that as said cam arm moves across said rod, this edge of said arm will remain in constant engagement with the end of said rod and slide thereon throughout the entire length of movement of said arm as determined by the throw of said foot pedal.

Adjacent the fixed or pedal end of this cam arm 20, the lower edge thereof is formed with a surface 51 formed concentric with the pivot 16 and this surface is connected by an outwardly inclined portion 52, with a second surface 53 formed concentric with said pivot but of greater radius. Toward the outer end of said arm this portion 53 is connected by an outwardly inclined portion 54 with a third concentric surface 55, the outer end of which is connected by an inwardly inclined portion 56, with a fourth concentric portion 57 at the end of said arm and which fourth portion is the same radial distance from the pivotal axis as that of the portion 53. The surface 55 is substantially opposite the accelerator cam 23 at the opposite or upper side of said arm.

Secured in place upon the frame 14 opposite the toe portion of the pedal 15, is an electric contact switch 58 of any suitable construction having a projecting pin 59 extending from one end thereof and adapted to be engaged by said pedal and moved inwardly thereby against the action of a coiled spring 60 to make electrical contact and close the circuit of an engine starting motor (not shown). As this switch is located at the toe portion of the foot pedal, it will not be operated thereby until said pedal has nearly reached the forward end of its swinging movement, and therefore said starter switch can be operated only when the roller 22 of the accelerator operating means is in contact with or is about to engage, the plain or concentric portion of the upper edge of the cam arm 20 as shown in Figure 7, with the motor decelerated or nearly so, and as the push rod 30 is in contact with the portion 57 of the lower edge of said arm, said push rod, in this position of the cam arm, is pushed inward, thereby effecting a disengagement of the clutch 2 and a release of the vehicle brakes, in the manner hereinafter described. Therefore the starting motor can be operated only when the clutch is out, freeing the engine so that it may turn over freely without driving the vehicle, and only with the brakes released. Failure to throw out the clutch or release the brakes before operating the starter, which failure might cause damage, is therefore obviated.

When the parts are in the position shown in Figure 1 with the motor decelerated and with the push rod 30 pushed inward to the limit of its movement by the engagement of the portion 51 of cam arm 20 contacting therewith, this inward movement of said push rod has exerted a push upon the spring 33, increasing the tension of said spring to such an extent, that it has moved the piston 31 downwardly, and thereby, through the stem 43 connecting the valves 36 and 39, has moved said valve 39 from its seat, whereby a free passage is opened past said valve 39 for oil under full pressure supplied to the chamber 40, to enter the chamber 37 and thence pass through the pipe 50 into the clutch cylinder 7. This oil pressure, say, for example, of forty pounds, is sufficient to move the pistons 6 and 8 toward opposite ends of the cylinder against the action of the clutch spring 3 and the spring 10 engaging the piston 8 and throw out the clutch and set the brakes. Therefore with the pedal 15 in